US012570086B2

(12) United States Patent
Greene et al.

(10) Patent No.: US 12,570,086 B2
(45) Date of Patent: Mar. 10, 2026

(54) SYSTEMS AND METHODS FOR PRINTING A TACTILE TEXTURED SURFACE ON A SURFACE OF A COMPONENT

(71) Applicant: THE BOEING COMPANY, Arlington, VA (US)

(72) Inventors: Edward Greene, Charleston, SC (US); Stephanie Metting, Seattle, WA (US); Jason Drexler, Edmonds, WA (US); Lloyd Layton Womack, II, Kirkland, WA (US); Anilegna Nunez Abreu, Lynnwood, WA (US)

(73) Assignee: The Boeing Company, Arlington, VA (US)

( * ) Notice: Subject to any disclaimer, the term of this patent is extended or adjusted under 35 U.S.C. 154(b) by 324 days.

(21) Appl. No.: 18/183,604

(22) Filed: Mar. 14, 2023

(65) Prior Publication Data

US 2024/0308203 A1 Sep. 19, 2024

(51) Int. Cl.
*B41J 3/407* (2006.01)
*B41J 2/01* (2006.01)
*B41J 2/045* (2006.01)

(52) U.S. Cl.
CPC ............. *B41J 2/04503* (2013.01); *B41J 2/01* (2013.01); *B41J 2/04586* (2013.01); *B41J 3/4073* (2013.01)

(58) Field of Classification Search
CPC ...... B41J 2/04503; B41J 2/01; B41J 2/04586; B41J 3/4073
See application file for complete search history.

(56) References Cited

U.S. PATENT DOCUMENTS

| | | | | |
|---|---|---|---|---|
| 6,164,850 | A * | 12/2000 | Speakman | B29C 64/112 101/490 |
| 9,272,465 | B2 | 3/2016 | Wilde | |
| 11,155,035 | B2 | 10/2021 | Miller et al. | |
| 2004/0000165 | A1 | 1/2004 | Max | |
| 2005/0052516 | A1 | 3/2005 | Wilde | |
| 2006/0023046 | A1* | 2/2006 | Miura | G02B 5/201 347/102 |
| 2006/0068109 | A1* | 3/2006 | Frankenberger | B05B 12/1472 427/256 |
| 2009/0269837 | A1 | 10/2009 | Shevkoplyas | |

(Continued)

FOREIGN PATENT DOCUMENTS

| | | |
|---|---|---|
| CN | 103221771 | 7/2013 |
| CN | 106232696 | 12/2016 |

(Continued)

OTHER PUBLICATIONS

Extended European Search Report for EP 24192035.4, dated Jan. 15, 2025.

*Primary Examiner* — Yaovi M Ameh
(74) *Attorney, Agent, or Firm* — Joseph M. Butscher; Carroll, Hoette & Butscher, LLC

(57) ABSTRACT

A method and system include controlling, by a control unit, a printer to form one or more tactile features on a surface of a component. Said controlling includes varying a speed of a print head of the printer to vary one or more attributes of the one or more tactile features. In at least one example, said varying the speed includes varying the speed of the print head of the printer during a single pass of the print head in relation to the surface of the component.

20 Claims, 3 Drawing Sheets

(56) References Cited

U.S. PATENT DOCUMENTS

| | | | | |
|---|---|---|---|---|
| 2011/0177303 | A1* | 7/2011 | Suehiro | B44C 3/02<br>427/261 |
| 2014/0055539 | A1 | 2/2014 | Hayata | |
| 2014/0242285 | A1 | 8/2014 | Pettersson et al. | |
| 2015/0190973 | A1 | 7/2015 | Martin | |
| 2017/0080747 | A1 | 3/2017 | Young | |
| 2020/0047868 | A1 | 2/2020 | Young | |
| 2020/0094481 | A1* | 3/2020 | Miller | G05B 19/4099 |
| 2021/0245859 | A1 | 8/2021 | Perkins | |

FOREIGN PATENT DOCUMENTS

| | | | | |
|---|---|---|---|---|
| CN | 108431109 | | 8/2018 | |
| JP | 2010162801 A | * | 7/2010 | B41J 2/2114 |

* cited by examiner

SYSTEMS AND METHODS FOR PRINTING A TACTILE TEXTURED SURFACE ON A SURFACE OF A COMPONENT

FIELD OF THE DISCLOSURE

Examples of the present disclosure generally relate to systems and methods for printing tactile textured surfaces on a surface of a component, such as a portion of a vehicle.

BACKGROUND OF THE DISCLOSURE

Printers are used to form features on various substrates. For example, printers can be used to deposit ink onto a surface of a sheet of paper to form text, graphics, and the like. As another example, printers can be used to form decorative surfaces on or within a vehicle, such as within an interior cabin of a commercial aircraft.

Traditional inkjet printing processes utilize an external encoder pulse generated from a shaft, or virtually, to establish a print clock. The print clock determines when pixels are printed. A print head jetting frequency changes depending on encoder pulses. In order to form raised tactile features on a substrate, numerous printing passes are used to additively form such features at desired heights. Each printing pass occurs over a defined time period, and such process can be time-consuming and inefficient. In general, known inkjet printing methods used to form tactile features typically require the use of numerous print passes to achieve a desired print height.

G-code is a computer numerical control programming language that can be used with respect to printing. G-code is typically used in computer-assisted manufacturing processes to control tools, machines, and the like. In known printing processes, G-code defines how to operate a servo motor of a printer. A G-code printing process is typically read left to right, then top to bottom. For example, N is a block of code, G dictates the type of command, F specifies a feed rate, and X is a position. A servo motor generates an encoder signal as the servo motor rotates. The signal can be simulated or obtained from the shaft rotation. Print head drive electronics generate a print clock based on the received encoder signal. Generally, encoder signal frequency is significantly higher than print clock frequency to ensure accurate printing. Encoder pulses generated are directly related to print speed. The faster the servo spins, the more encounter pulses are generated. The drive electronics send data to the print head in the form of a bit map. Pixels are sequentially printed as print clock pulses are received. In such an example, a traditional printing process can be used to form tactile features by printing an ultraviolet (UV) curable ink with many passes. and curing the ink in between passes. Again, such a process is time consuming and inefficient.

SUMMARY OF THE DISCLOSURE

A need exists for a method of efficiently and effectively printing tactile features on a component. A need exists for a method of printing tactile features that is faster than known methods of using multiple passes of a print head.

With those needs in mind, certain examples of the present disclosure provide a method including controlling, by a control unit, a printer to form one or more tactile features on a surface of a component. Said controlling includes varying a speed of a print head of the printer to vary one or more attributes of the one or more tactile features.

In at least one example, the one or more tactile features include a plurality of tactile features. At least two of the plurality of tactile features differ in relation to the one or more attributes.

In at least one example, said varying the speed includes varying the speed of the print head of the printer during a single pass of the print head in relation to the surface of the component.

The attributes can include one or both of height or width. In at least one example, said varying the speed includes reducing the speed of the print head to form the one or more tactile features having an increased height. Such one or more tactile features can have a reduced width. In at least one example, said varying the speed includes increasing the speed of the print head to form the one or more tactile features having an increased width. Such one or more tactile features can have a reduced height.

The method can also include creating, by the control unit, a desired output display that includes the one or more tactile features through unit vector mapping.

In at least one example, said controlling further includes jetting ink from one or more nozzles of the print head at a constant print frequency.

The component can be on or within a vehicle. The surface can be curved.

Certain examples of the present disclosure provide a system including a printer having a print head. A control unit is configured to control the printer to form one or more tactile features on a surface of a component. The control unit is configured to vary a speed of the print head of the printer to vary one or more attributes of the one or more tactile features.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word “a” or “an” should be understood as not necessarily excluding the plural of the elements or steps. Further, references to “one example” are not intended to be interpreted as excluding the existence of additional examples that also incorporate the recited features. Moreover, unless explicitly stated to the contrary, examples “comprising” or “having” an element or a plurality of elements having a particular condition can include additional elements not having that condition.

As described herein, examples of the present disclosure provide systems and methods for printing tactile textured features on a component, such as may have a complex curvature, in a single pass of a print head.

Figure 1:
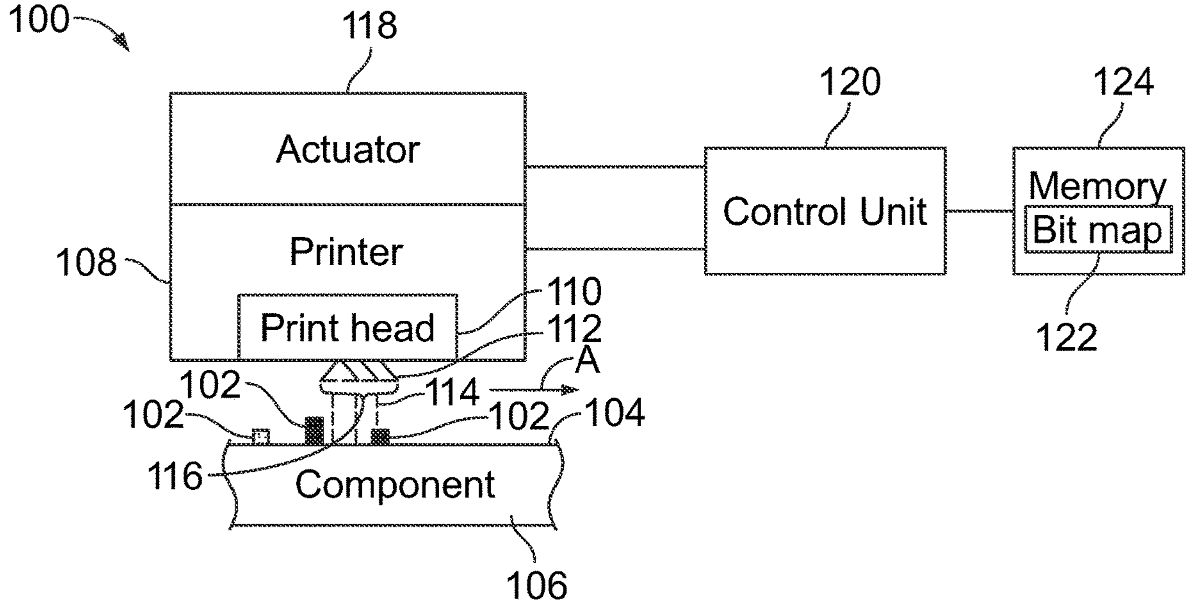
FIG. 1 illustrates a simplified block diagram of a system, according to an example of the present disclosure.

FIG. 1 illustrates a simplified block diagram of a system 100, according to an example of the present disclosure. The system 100 is configured to print one or more tactile features 102 on a surface 104 of a component 106. In at least one example, the component 106 is a portion of a vehicle, such as an outer surface of a fuselage, a wing, or the like. As another example, the component 106 is within an internal cabin of the vehicle, such as a wall, ceiling, floor, or the like within the vehicle. As another example, the component 106 can be a structure on or within a fixed structure. As another example, the component 106 can be a substrate, such as paper, a panel, or the like. The surface 104 of the component 106 can be flat and planar. As another example, the surface 104 can include one more curves, such can have a regular or irregular curvature.

The system 100 includes a printer 108 having a print head 110, which includes one or more nozzles 112 configured to deposit ink 114 onto the surface 104. In at least one example, the print head 110 includes a single nozzle 112. As another example, the print head 110 includes two, three, four, five, or more nozzles 112. A swath 116 of the print head 110 is a width across the one or more nozzles 112.

The printer 108 is coupled to an actuator 118, which is configured to move the print head 110. In at least one example, the print head 110 includes a single axis servo motor having a linear actuator. The actuator 118 is configured to move the print head 110 over a pass in relation to the surface 104 of the component 106. The actuator 118 can be separate and distinct from the printer 108. As another example, the printer 108 includes the actuator 118.

A control unit 120 is in communication with the printer 108 and the actuator 118, such as through one or more wired or wireless connections. The control unit 120 is configured to operate the actuator 118 and the printer 108 to form the tactile features 102 on the surface 104 of the component 106 based on data 122 stored within a memory 124 that is communication with the control unit 120, such as through one or more wired or wireless connections. For example, the data 122 can be a bit map of the tactile features 102 to be formed on the surface 104 of the component 106. The memory 124 can be separate and distinct from the control unit 120. As another example, the control unit 120 includes the memory 124.

In operation, in order to form the tactile features 102, the printer 108 is moved in a single pass in the direction of arrow A (such as from left to right, right to left, top to bottom, or bottom to top) in relation to the surface 104. The control unit 120 operates the printer 108 to deposit the ink 114 onto the surface 104 to form the tactile features 102 during the single pass of the printer 108. In order to form the tactile features 102 having different attributes (such a heights and widths), the control unit varies the speed of the printer 108 in the direction of arrow A during the single pass, instead of operating the printer over multiple passes.

Figure 2:
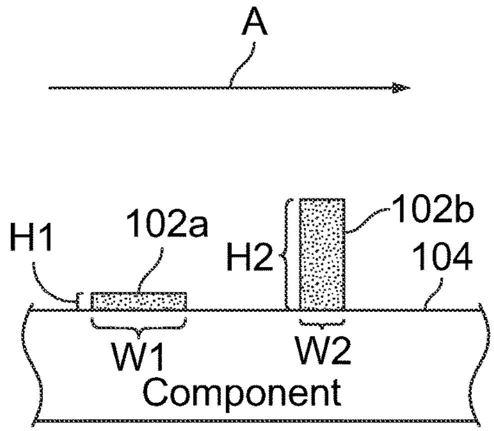
FIG. 2 illustrates a simplified lateral view of a component, according to an example of the present disclosure.

FIG. 2 illustrates a simplified lateral view of the component 106, according to an example of the present disclosure. Referring to FIGS. 1 and 2, the control unit 120 operates the printer 108 to form the tactile features 102*a* and 102*b* during a single pass of the print head 110 in the direction of arrow A. As shown, the tactile feature 102*a* has a first width W1 along a portion of the surface 104, and a first height H1 above the surface 104. The tactile feature 102*a* has a second width W2 along a portion of the surface 104, and a second height H2 above the surface 104. The first width W1 differs from the second width W2. As shown, the first width W1 is greater than the second width W2. The first height H1 differs from the second height H2. As shown, the first height H1 is less than the second height H2.

In order to form a taller tactile feature having a thinner width, such as the tactile feature 102*b*, the control unit 120 decreases the speed of the print head 110 during the single pass in the direction of arrow A, thereby concentrating more ink droplets at a tighter location. Consequently, the ink droplets form the higher, thinner tactile feature 102*b*. In contrast, in order to form a shorter tactile feature having a greater width, the control unit increases the speed of the print head 110 during the single pass in the direction of arrow A, thereby spreading the ink droplets over a wider area, and which reduces the build-up in height. In this manner, the control unit 120 operates the printer 108 to form tactile features 102 having different attributes (such as different heights and/or widths) on the surface 104 of the component 106 by varying the speed of the print head 110, as controlled by the actuator 118, during the single pass in the direction of arrow A.

Figure 3:
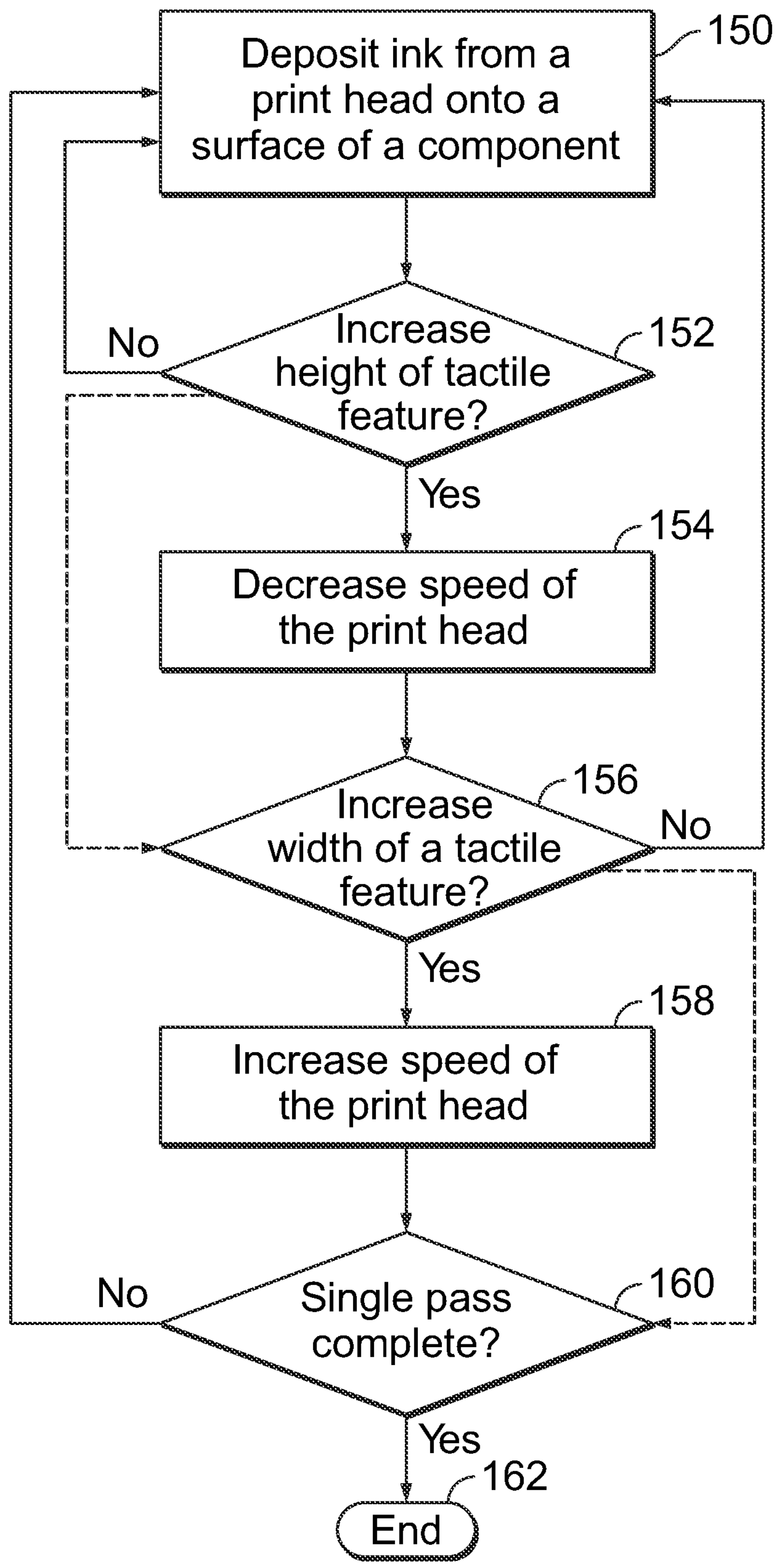
FIG. 3 illustrates a flow chart of a method, according to an example of the present disclosure.

FIG. 3 illustrates a flow chart of a method, according to an example of the present disclosure. Referring to FIGS. 1-3, at 150, the control unit 120 operates the printer 108 to deposit the ink 114 from the print head 110 onto the surface 104 of the component 106104. At 152, the control unit 120 determines, such as via the data 122 in the memory 124, if a height of a tactile feature 102 to be printed on the surface 104 is to be increased. If not, the method returns to 150 (or proceeds to 156).

If, however, the height of the tactile feature 102 is to be increased, the control unit 120 decreases the speed of the print head 110 (via operation of the actuator 118) during the single pass in the direction of arrow A, thereby building up an increased amount of ink at a particular location (defined by the data 122) to form the tactile feature 102. Such a feature can have a reduced width.

At 156, the control unit 120 determines, such as via the data 122 in the memory, if a width of a tactile feature 102 to be printed on the surface 104 is to be increased. Step 156 can occur before 152. The method can include step 156 and not step 152, or vice versa.

If the width of a tactile feature 102 is to be increased, the method can return to 150, or optionally proceed to 160. If, however, the width of the tactile feature 102 is to be increased (and the height reduced), the method proceeds from 156 to 158, at which the control unit 120 increases the speed of the print head 110 (via operation of the actuator 118) during the single pass in the direction of arrow A to form the tactile feature 102. Such a feature can have a reduced height.

At 160, the control unit 120 determines if the single pass is complete. If not, the method returns to 150. If, however, the control unit 120 determines that the single pass is complete, the method proceeds from 160 to 162, at which the method ends.

As described herein, the control unit 120 is configured to vary a speed of the print head 110 of the printer 108 during a single pass in the direction of arrow A to form tactile features 102 having different attributes, such as different heights and/or different widths. Optionally, the control unit 120 can form such tactile features 102 by varying the speed of the print head 110 using additional passes in the direction of arrow A, the opposite of arrow A, and/or the like.

In at least one example, the control unit 120 is configured to operate the printer to build tactile textured features 102 in a single pass of the print head 110 in the direction of arrow A. In at least one example, instead of using an established print clock from an encoder pulse train, the control unit 120 maintains the print clock at a frequency that optimizes head acoustics. The control unit 120 can then operate the printer 108 to form the tactile features 102 through the data 122 and varying the speed of the print head 110. Faster print speeds create a shorter texture (that is, a reduced height) while slower print speeds create a taller texture (that is, an increased height). The data 122, such as bit map data, accounts for any complex curvature of the surface 104 to achieve a desired printed output.

In at least one example, the desired output display to be formed on the surface 104 (such as printed text, images, graphics, and/or the like) is stored as the data 122 within the memory 124. The output display can be created through one or more steps, which can be conducted by the control unit 120. For example, the output display can be created through unit vector mesh unwrapping and image texturing in conjunction with pixel clustering in relation to print speed.

In at least one example, rather than defining the print clock with encoder pulses received from a servo motor, the control unit 120 sets the print clock set to a specific frequency that optimizes acoustics of the print head 110, such as 30k Hz. The control unit 120 constantly sends a 30 KHz print clock to the print head 110. Consequently, when printing at different speeds, tactile features 102 having different attributes are formed.

In at least one example, the tactile features 102 are created in a single pass when jetting at a constant print frequency using an ultraviolet curable translucent ink. The speed of the print head 110 dictates the height of the tactile features 102.

In at least one example, the control unit 120 operates the printer 108 to constantly jet the ink 114 from the nozzle(s) 112 during the single pass in the direction of arrow A. In order to form the textured features 102 having different attributes, the control unit 120 synchronizes the speed of the print head 110 with the data 122, such as the bit map data, to enable single pass complex curvature textured printing. The control unit 120 operates to vary the attributes (for example, heights and/or widths) of the tactile features 102 by controlling the speed of the print head 110 in the direction of arrow A in accordance with the data 122. The speed of the print head 110 is varied during the single pass in the direction of arrow A to vary attributes of the tactile features 102.

The systems and methods described here can be used to print tactile features 102 on complex curved surfaces, such as within an internal cabin of a commercial aircraft. The systems and methods described herein can be used in place of traditional embossing processes, which can be inefficient and prone to rework.

In at least one example, the control unit 120 is configured to operate the printer 108 to form the tactile features 102 on a curved surface. For example, the control unit analyzes the shape of the curved surface, and provides a unit vector map of the curved surface, such as in a two dimensional plane. By unit vector mapping the curved surface, the control unit 120 ensures that the formed tactile features 102 on the curved surface are accurate and undistorted.

As described herein, examples of the present disclosure provide a method including controlling, by the control unit 120, the printer 108 to form one or more tactile features 102 on the surface 104 of the component 106. Said controlling includes varying a speed of the print head 110 of the printer 108 to vary one or more attributes of the one or more tactile features 102. In at least one example, said varying the speed includes varying the speed of the print head 110 of the printer 108 during a single pass of the print head 110 in relation to the surface 104 of the component 106.

In at least one example, the one or more tactile features 102 include a plurality of tactile features 102. At least two of the plurality of tactile features 102 differ in relation to the one or more attributes. For example, the two different tactile features 102 can have different heights, and/or different widths.

In at least one example, the attributes include one or both of height or width. For example, said varying the speed includes reducing the speed of the print head 110 to form the one or more tactile features 102 having an increased height. In this example, the one or more tactile features 102 can also have a reduced width. In at least one example, said varying the speed includes increasing the speed of the print head 110 to form the one or more tactile features 102 having an increased width. In this example, the one or more tactile features 102 can also have a reduced height.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 120 may be or include one or more processors that are configured to control operation, as described herein.

The control unit 120 is configured to execute a set of instructions that are stored in one or more data storage units or elements (such as one or more memories), in order to process data. For example, the control unit 120 may include or be coupled to one or more memories. The data storage units may also store data or other information as desired or needed. The data storage units may be in the form of an information source or a physical memory element within a processing machine.

The set of instructions may include various commands that instruct the control unit 120 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 120. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 120 may represent processing circuitry such as one or more of a field programmable gate array (FPGA), application specific integrated circuit (ASIC), microprocessor(s), and/or the like.

The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 4:
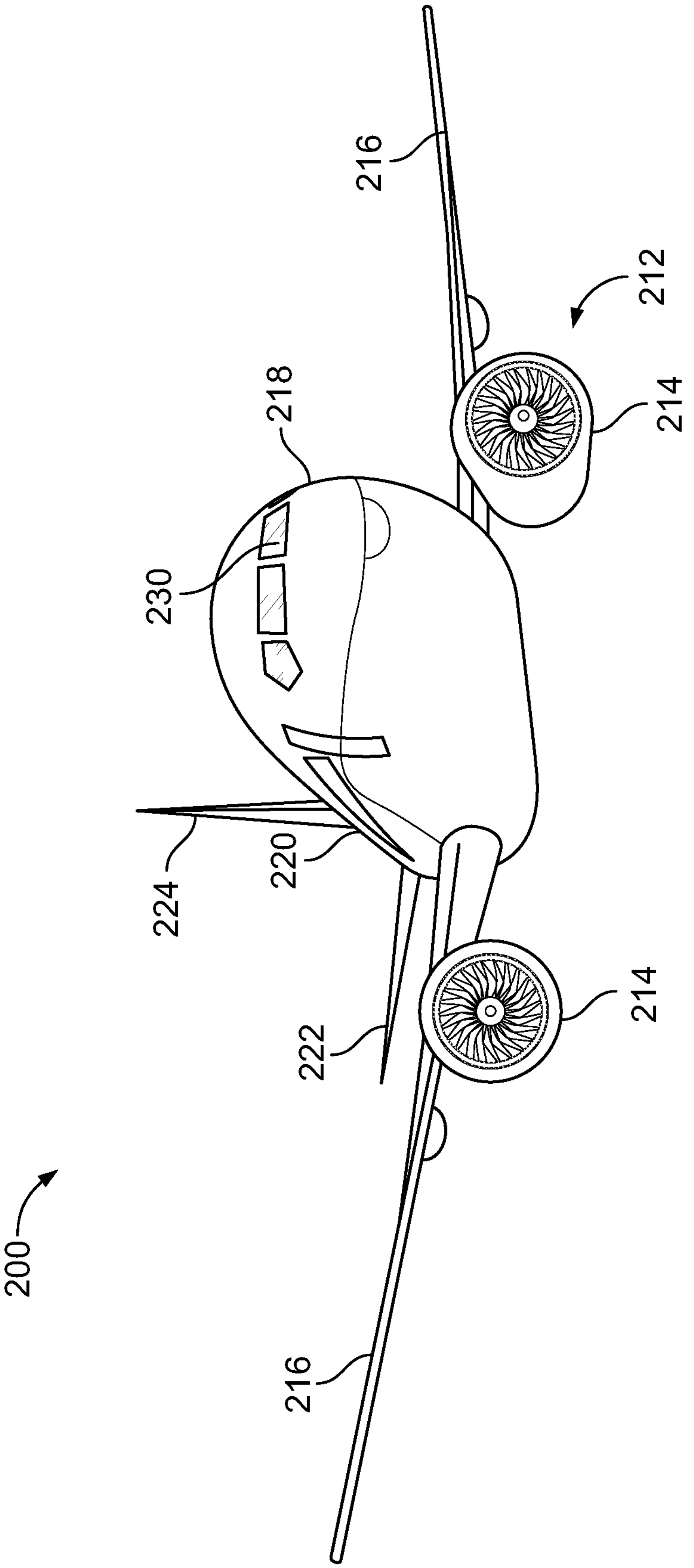
FIG. 4 illustrates a perspective front view of an aircraft, according to an example of the present disclosure.

FIG. 4 illustrates a perspective front view of an aircraft 200, according to an example of the present disclosure. The aircraft 200 includes a propulsion system 212 that includes engines 214, for example. Optionally, the propulsion system 212 may include more engines 214 than shown. The engines 214 are carried by wings 216 of the aircraft 200. In other examples, the engines 214 may be carried by a fuselage 218 and/or an empennage 220. The empennage 220 may also support horizontal stabilizers 222 and a vertical stabilizer 224. The fuselage 218 of the aircraft 200 defines an internal cabin 230, which includes a flight deck or cockpit, one or more work sections (for example, galleys, personnel carry-on baggage areas, and the like), one or more passenger sections (for example, first class, business class, and coach sections), one or more lavatories, and/or the like. Referring to FIGS. 1-4, the aircraft 200 includes various components having surfaces. Examples of the present disclosure can be used to print tactile surfaces 102 on and/or within the aircraft 200.

FIG. 4 shows an example of an aircraft 200. It is to be understood that the aircraft 200 can be sized, shaped, and configured differently than shown in FIG. 4. Optionally, examples of the present disclosure can be used with various other vehicles. For example, instead of an aircraft, the vehicle can be a land-based vehicle, such as an automobile, a bus, a train car, or the like. As another example, the vehicle can be a watercraft. As another example, the vehicle can be a spacecraft. Optionally, examples of the present disclosure can be used with fixed structures, such as residential or commercial buildings.

Further, the disclosure comprises examples according to the following clauses:

Clause 1. A method comprising:

controlling, by a control unit, a printer to form one or more tactile features on a surface of a component, wherein said controlling comprises varying a speed of a print head of the printer to vary one or more attributes of the one or more tactile features.

Clause 2. The method of Clause 1, wherein the one or more tactile features comprise a plurality of tactile features, and wherein at least two of the plurality of tactile features differ in relation to the one or more attributes.

Clause 3. The method of Clauses 1 or 2, wherein said varying the speed comprises varying the speed of the print head of the printer during a single pass of the print head in relation to the surface of the component.

Clause 4. The method of any of Clauses 1-3, wherein the attributes comprise one or both of height or width.

Clause 5. The method of Clause 4, wherein said varying the speed comprises reducing the speed of the print head to form the one or more tactile features having an increased height.

Clause 6. The method of Clause 5, wherein the one or more tactile features have a reduced width.

Clause 7. The method of any of Clauses 4-6, wherein said varying the speed comprises increasing the speed of the print head to form the one or more tactile features having an increased width.

Clause 8. The method of Clause 7, wherein the one or more tactile features having a reduced height.

Clause 9. The method of any of Clauses 1-8, further comprising creating, by the control unit, a desired output display that includes the one or more tactile features through unit vector mapping.

Clause 10. The method of any of Clauses 1-9, wherein said controlling further comprises jetting ink from one or more nozzles of the print head at a constant print frequency.

Clause 11. The method of any of Clauses 1-10, wherein the component is on or within a vehicle, and wherein the surface is curved.

Clause 12. A system comprising:

a printer including a print head; and a control unit configured to control the printer to form one or more tactile features on a surface of a component, wherein the control unit is configured to vary a speed of the print head of the printer to vary one or more attributes of the one or more tactile features.

Clause 13. The system of Clause 12, wherein the one or more tactile features comprise a plurality of tactile features, and wherein at least two of the plurality of tactile features differ in relation to the one or more attributes.

Clause 14. The system of Clauses 12 or 13, wherein the control unit is configured to vary the speed of the print head of the printer during a single pass of the print head in relation to the surface of the component.

Clause 15. The system of any of Clauses 12-14, wherein the attributes comprise one or both of height or width, wherein the control unit is configured to vary the speed by (a) reducing the speed of the print head to form the one or more tactile features having an increased height, and (b) increasing the speed of the print head to form the one or more tactile features having an increased width.

Clause 16. The system of any of Clauses 12-15, wherein the control unit is further configured to create a desired output display that includes the one or more tactile features through unit vector mapping.

Clause 17. The system of any of Clauses 12-16, wherein the control unit is configured to control the printer by jetting ink from one or more nozzles of the print head at a constant print frequency.

Clause 18. The system of any of Clauses 12-17, wherein the component is on or within a vehicle, and wherein the surface is curved.

Clause 19. A method comprising:

controlling, by a control unit, a printer to form a plurality of tactile features on a surface of a component, wherein said controlling comprises varying a speed of a print head of the printer during a single pass to vary one on or both of height or width of the plurality of tactile features, wherein at least two of the plurality of tactile features differ in relation to one or both of the height or the width, said varying the speed comprises:

reducing the speed of the print head to form at least one of the plurality of tactile features having an increased height, and increasing the speed of the print head to form at least one of the plurality of tactile features having an increased width.

Clause 20. The method of Clause 19, further comprising:

creating, by the control unit, a desired output display that includes the one or more tactile features through unit vector mapping; and jetting ink from one or more nozzles of the print head at a constant print frequency.

As described herein, examples of the present disclosure provide systems and methods for efficiently and effectively printing tactile features on a component. Further, examples of the present disclosure provide methods of printing tactile features that are faster than conventional methods of using multiple passes of a print head.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third." etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method comprising:

creating, by a control unit, a desired output display that includes one or more tactile features on a surface of a component through unit vector mapping, wherein said creating comprises: (a) providing, by the control unit, a unit vector map of the surface of the component in a two dimensional plane, and (b) unit vector mesh unwrapping and image texturing in conjunction with pixel clustering in relation to a speed of a print head of a printer;

controlling, by the control unit, the printer to form the one or more tactile features on the surface of the component, wherein said controlling comprises varying the speed of the print head of the printer to vary one or more attributes of the one or more tactile features.

2. The method of claim 1, wherein the one or more tactile features comprise a plurality of tactile features, and wherein at least two of the plurality of tactile features differ in relation to the one or more attributes.

3. The method of claim 1, wherein said varying the speed comprises varying the speed of the print head of the printer during a single pass of the print head in relation to the surface of the component.

4. The method of claim 1, wherein the attributes comprise one or both of height or width.

5. The method of claim 4, wherein said varying the speed comprises reducing the speed of the print head to form the one or more tactile features having an increased height.

6. The method of claim 5, wherein the one or more tactile features have a reduced width.

7. The method of claim 4, wherein said varying the speed comprises increasing the speed of the print head to form the one or more tactile features having an increased width.

8. The method of claim 7, wherein the one or more tactile features having a reduced height.

9. The method of claim 1, wherein said controlling further comprises jetting ink from one or more nozzles of the print head at a constant print frequency.

10. The method of claim 1, wherein the component is on or within a vehicle, and wherein the surface is curved.

11. A system comprising:

a printer including a print head; and a control unit configured to:

provide a unit vector map of a surface of a component in a two-dimensional plane, create a desired output display that includes one or more tactile features on the surface of the component through the unit vector map, wherein the control unit is configured to create the desired output display through unit vector mesh unwrapping and image texturing in conjunction with pixel clustering in relation to a speed of the print head, and control the printer to form the one or more tactile features on the surface of the component, wherein the control unit is configured to vary the speed of the print head of the printer to vary one or more attributes of the one or more tactile features.

12. The system of claim 11, wherein the one or more tactile features comprise a plurality of tactile features, and wherein at least two of the plurality of tactile features differ in relation to the one or more attributes.

13. The system of claim 11, wherein the control unit is configured to vary the speed of the print head of the printer during a single pass of the print head in relation to the surface of the component.

14. The system of claim 11, wherein the attributes comprise one or both of height or width, wherein the control unit is configured to vary the speed by (a) reducing the speed of the print head to form the one or more tactile features having an increased height, and (b) increasing the speed of the print head to form the one or more tactile features having an increased width.

15. The system of claim 11, wherein the control unit is configured to control the printer by jetting ink from one or more nozzles of the print head at a constant print frequency.

16. The system of claim 11, wherein the component is on or within a vehicle, and wherein the surface is curved.

17. A method comprising:

creating, by a control unit, a desired output display that includes tactile features on a surface of a component through unit vector mapping, wherein said creating comprises: (a) providing, by the control unit, a unit vector map of the surface of the component in a two dimensional plane, and (b) unit vector mesh unwrapping and image texturing in conjunction with pixel clustering in relation to a speed of a print head of a printer;

controlling, by the control unit, the printer to form the tactile features on the surface of the component, wherein said controlling comprises varying the speed of the print head of the printer during a single pass to vary one on or both of height or width of the plurality of tactile features, wherein at least two of the plurality of tactile features differ in relation to one or both of the height or the width, said varying the speed comprises:

reducing the speed of the print head to form at least one of the plurality of tactile features having an increased height, and increasing the speed of the print head to form at least one of the plurality of tactile features having an increased width.

18. The method of claim 17, further comprising jetting ink from one or more nozzles of the print head at a constant print frequency.

19. The method of claim 17, wherein the component is on or within a vehicle.

20. The method of claim 19, and wherein the surface is curved.

* * * * *